(12) United States Patent
Ashida

(10) Patent No.: US 7,129,980 B1
(45) Date of Patent: Oct. 31, 2006

(54) IMAGE CAPTURING APPARATUS AND AUTOMATIC EXPOSURE CONTROL CORRECTING METHOD

(75) Inventor: Tetsuro Ashida, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,382

(22) Filed: Jan. 27, 2000

(30) Foreign Application Priority Data

Jan. 25, 1999 (JP) ................................. 11-015373

(51) Int. Cl.
  H04N 5/222 (2006.01)
  H04N 9/43 (2006.01)
  H04N 5/235 (2006.01)
  H04N 5/238 (2006.01)
  G06K 9/00 (2006.01)

(52) U.S. Cl. ............... 348/333.04; 348/34; 348/229.1; 348/364; 382/167

(58) Field of Classification Search ............... 348/366, 348/32, 34, 211.13, 229.1, 230.1, 231.6, 239, 348/256, 333.02, 333.04, 333.12, 252, 364; 382/167
See application file for complete search history.

(56) References Cited

U.S. PATENT DOCUMENTS

| | | | | |
|---|---|---|---|---|
| 5,041,911 A | * | 8/1991 | Moorman | 348/32 |
| 5,164,836 A | * | 11/1992 | Jackson et al. | 348/364 |
| 5,625,415 A | * | 4/1997 | Ueno et al. | 348/350 |
| 5,877,809 A | * | 3/1999 | Omata et al. | 348/345 |
| 6,108,441 A | * | 8/2000 | Hiratsuka et al. | 382/167 |
| 6,313,923 B1 | * | 11/2001 | Takanashi et al. | 358/1.18 |
| 6,535,245 B1 | * | 3/2003 | Yamamoto | 348/333.04 |
| 6,765,618 B1 | * | 7/2004 | Sato | 348/348 |
| 2005/0248677 A1 | * | 11/2005 | Katagiri et al. | 348/333.02 |

FOREIGN PATENT DOCUMENTS

| | | | |
|---|---|---|---|
| JP | 62042158 A | * | 2/1987 |
| JP | 1193708 | | 8/1989 |
| JP | 04256184 A | * | 9/1992 |
| JP | 05260351 A | * | 10/1993 |
| JP | 738801 | | 2/1995 |
| JP | 08202325 A | * | 8/1996 |
| JP | 09322102 A | * | 12/1997 |

OTHER PUBLICATIONS

"Gradation." Def. 2. Webster's II New Riverside University Dictionary. 1994.*

* cited by examiner

*Primary Examiner*—David Ometz
*Assistant Examiner*—John M. Villecco
(74) *Attorney, Agent, or Firm*—Birch, Stewart, Kolasch & Birch, LLP

(57) ABSTRACT

When a shutter release button of an image capturing apparatus is half pressed, an exposure time t is determined by a normal AE function. Then, if a shutter release button is fully pressed, an image is captured with the exposure time t, and the captured image is stored in a frame memory. At the same time, a color-coding circuit color-codes the captured image according to luminance thresholds, and the color-coded image is displayed on an LCD. If a user selects a color of an area equivalent to a main subject with reference to the color-coded image, a dynamic range, gamma characteristics, and the like of the image are determined so that the area in the selected color can have a correct luminance. The image is corrected accordingly, and image data acquired by the correction is stored in a recording part.

4 Claims, 4 Drawing Sheets

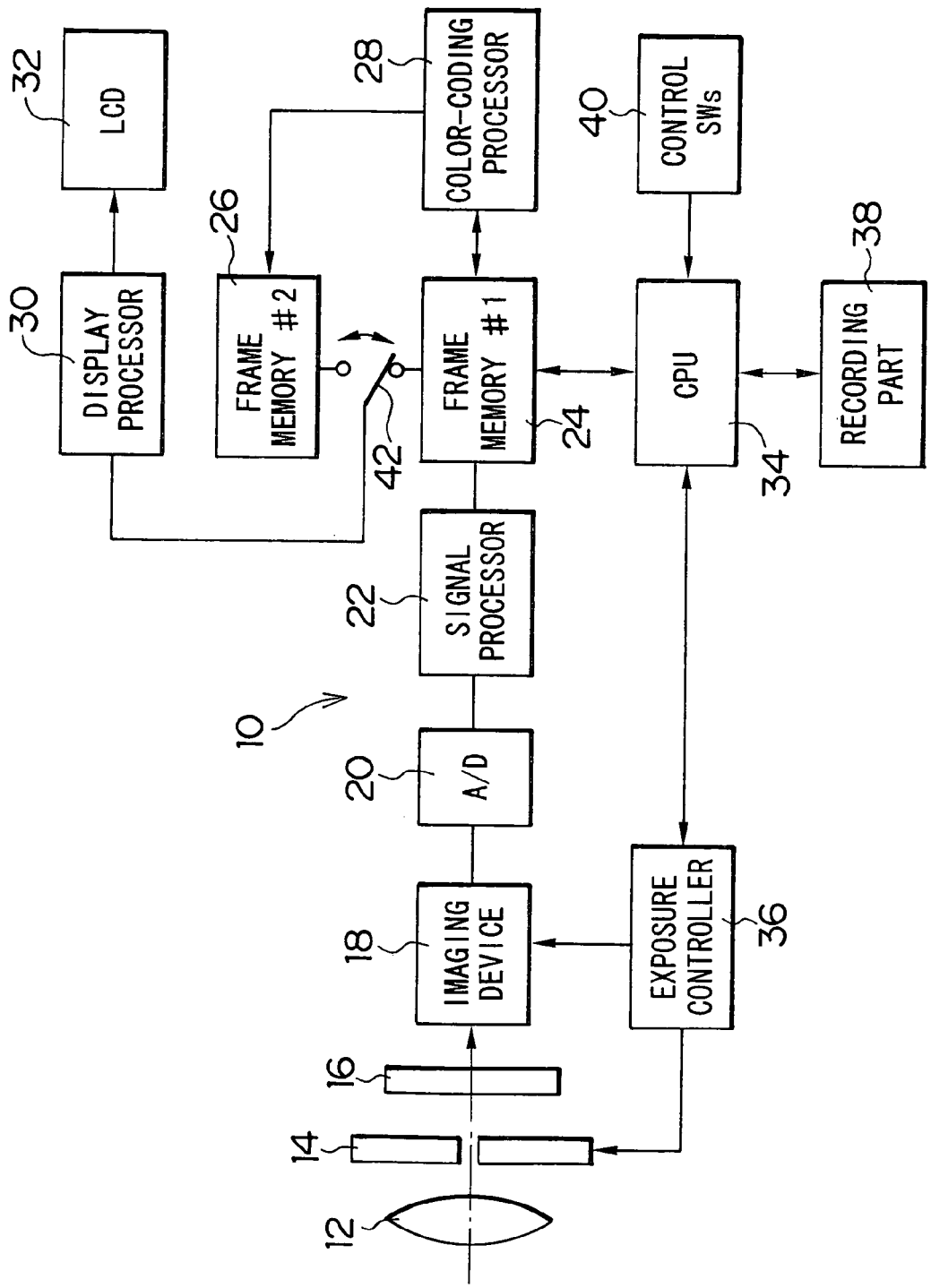
F I G. 1

F I G. 2
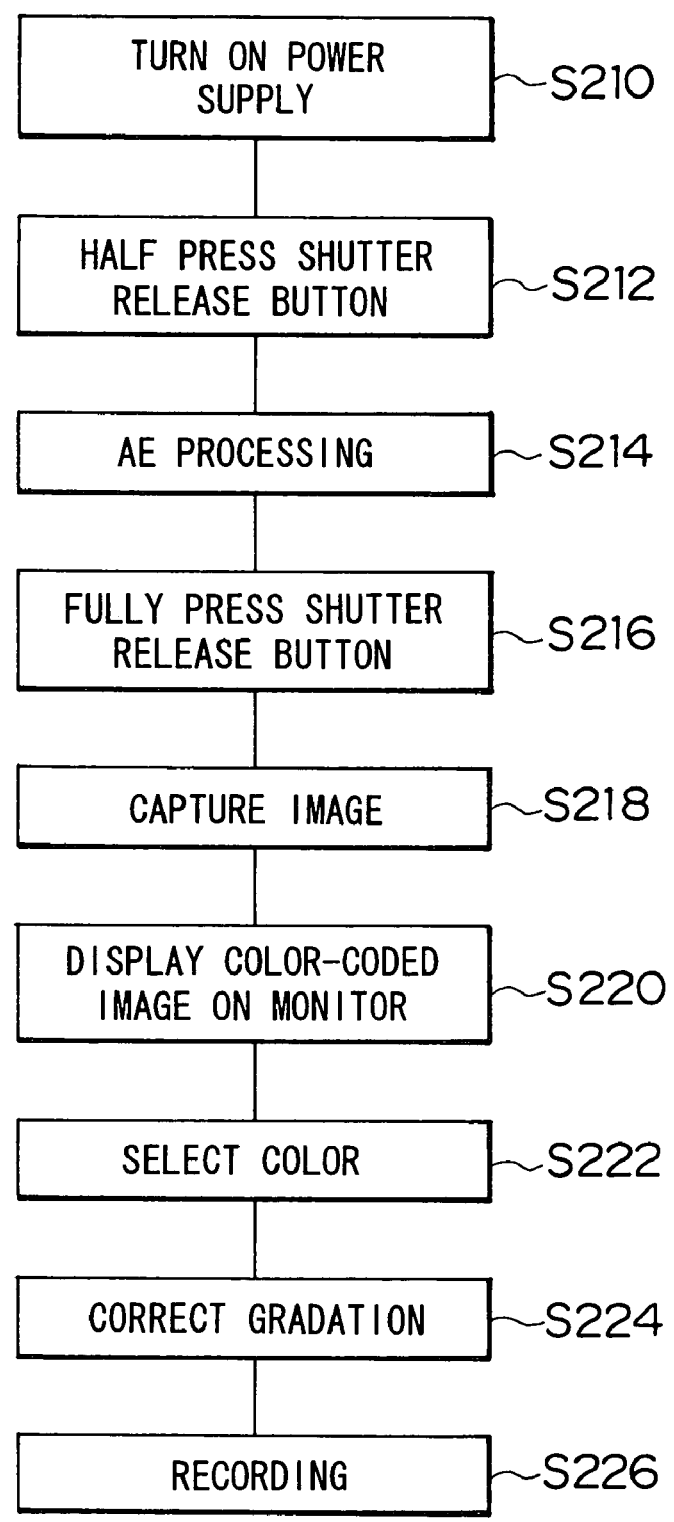

F I G. 3
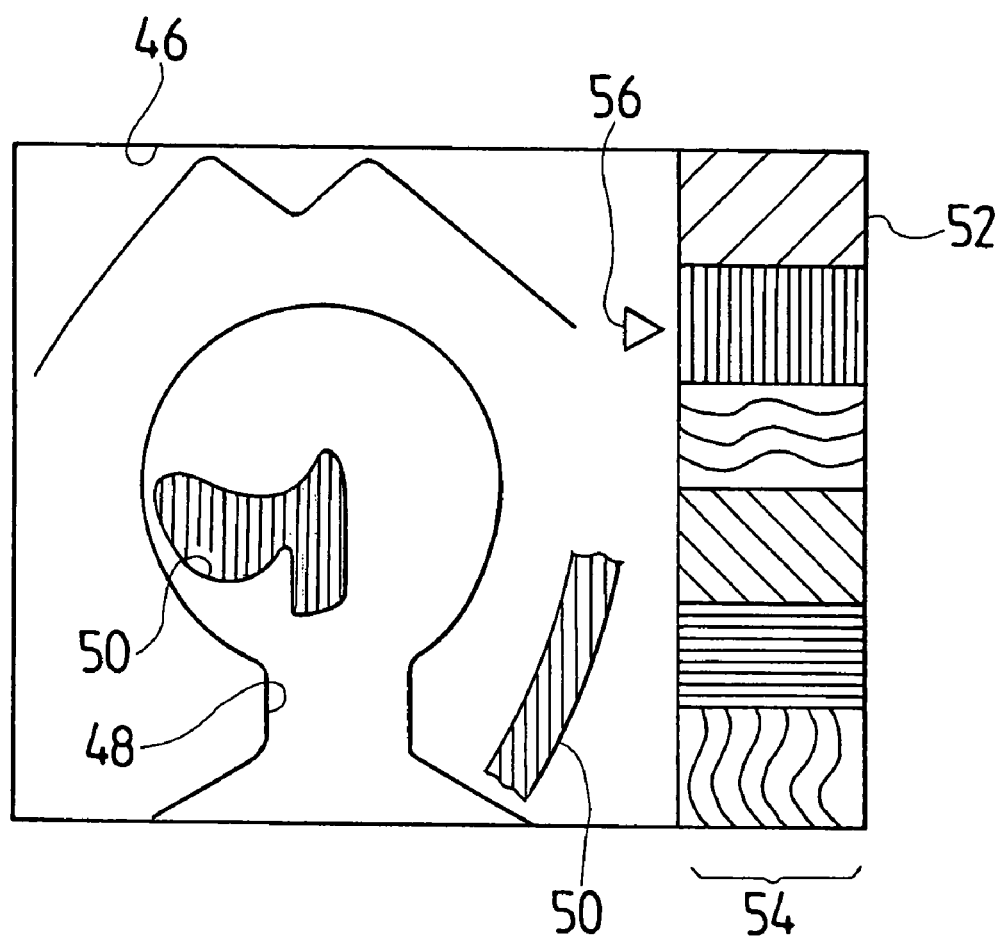

IMAGE CAPTURING APPARATUS AND AUTOMATIC EXPOSURE CONTROL CORRECTING METHOD

BACKGROUND OF THE INVENTION

1. Field of the Invention

The present invention relates in general to an image capturing apparatus and an automatic exposure control correcting method. More specifically, the invention relates to an automatic exposure control correcting method for obtaining correct exposure by complementing an automatic exposure adjusting function of an electronic image capturing apparatus, such as an electronic still camera and a video camera, that converts an optical image into electronic image signals with an imaging device and the image capturing apparatus for use in this method.

2. Description of Related Art

An electronic image capturing apparatus or an electronic camera that converts an optical image into electronic image signals by an imaging device such as a charge-coupled device (CCD) image sensor has an automatic exposure adjusting function (AE function) for automatically adjusting a diaphragm and a shutter according to a photometry value and automatically controlling the time in which electric charges are stored in the CCD image sensor. An image captured by the electronic camera with an exposure adjusted by the AE function often has lower image quality than a silver halide photograph. The main subject as well as the background can be blackened or partially whitened. This is because an acceptable dynamic range of the imaging device is much narrower than a silver halide film, and thus, the incorrectness of the AE severely affects the image quality in the electronic image capturing.

To improve the AE performance in the conventional cameras, a screen is divided into a plurality of areas, a scene is identified according to a differences in luminance between the center and the adjacent areas, and the AE is determined according to the identification. Even if the AE is excellent, however, it is difficult to obtain correct exposure for a subject out of AE pattern. To address this problem, there is proposed a method in which the AE is controlled in real-time. For example, Japanese Patent Provisional Publication No. 7-38801 discloses an image capturing apparatus that produces a histogram of a pixel luminance distribution of a captured image during the image capturing and displays the histogram as well as the captured image on an electronic viewfinder to thereby enable an easy confirmation as to the correctness of the exposure. This image capturing apparatus, however, cannot always obtain a correct exposure for a main subject even if the correctness of the exposure is determined from the entire luminance distribution with reference to the histogram displayed on the electronic viewfinder.

As a result of an experiment, the present inventor confirmed that the conventional AE function causes an error of ±1.5EV when a variety of scenes is imaged. Thus, there is a limitation to the AE performance of the camera.

Japanese Patent Provisional Publication No. 1-193708 discloses an autofocus device in a camera that displays an image captured by an imaging device on a liquid crystal display (LCD) part provided with a touch panel and enlarges the image about a touched position on the LCD part to recapture with the focus adjusted on the touched position. This publication, however, does not mention the AE.

SUMMARY OF THE INVENTION

In view of the foregoing, it is an object of the present invention to provide an image capturing apparatus and an AE correcting method therefor, which complement an automatic exposure (AE) function of a camera to always obtain a correct exposure for a main subject in order to obtain a high quality image.

The invention accomplishes the above object by providing an image capturing apparatus, comprising: an imaging system including a lens and an imaging device, the lens forming an image of a subject on a light receiving surface of the imaging device, the imaging device converting the image of the subject to an electronic image signals; a display unit that displays an image in accordance with signals captured through the imaging device; a photometry device that determines a luminance of the subject; an automatic exposure control device that automatically adjusts exposure of the imaging system in accordance with the luminance of the subject determined by the photometry device; a gradation area dividing device that processes the electronic image signals read from the imaging device so as to divide, according to predetermined luminance thresholds, an image obtained by an image-capturing through the imaging system into areas of gradations coarser than gradations in the image-capturing; a color-coding device that generates an image signal representing a gradation area divided image by applying the same color to at least one area in the same luminance range in the image obtained by the image-capturing so that the areas of gradations divided by the gradation area dividing device are visually distinguished, the display unit receiving the image signal generated by the color-coding device and displaying the gradation area divided image; a luminance range designating device that designates one of the gradations in the gradation area divided image displayed on the display unit; a correcting device that corrects at least one of exposure control of the automatic exposure device and image data obtained with the exposure control so as to obtain a correct exposure for the one of the gradations designated by the luminance range designating device; and a recording device that records the image data corrected by the correcting device.

According to the present invention, the image acquired using the AE function of the automatic exposure control device is divided according to the predetermined luminance thresholds, and the image is divided into gradation areas so that the areas can be distinguished visually. If the user designates an area equivalent to a main subject with reference to the classification, the image is corrected so that the designated area can have a correct exposure. Alternatively, the AE function is corrected so that the designated area can have a correct exposure, and the image is captured according to a corrected AE value. Consequently, the main subject can be imaged with the correct exposure, and a high quality image can be acquired without fail in every imaging. The recording device records the correct image.

The invention also accomplishes the above object by providing an automatic exposure correcting method comprising the steps of: imaging by automatically controlling exposure of an imaging system including an imaging device in accordance with results of photometry; dividing an image acquired by the imaging step according to predetermined luminance thresholds, and dividing the image into areas of gradations coarser than gradations in the imaging step; displaying, on an image display unit, a gradation area divided image in which the same luminance range is given the same color so that the divided areas of gradations can be distinguished visually; selecting one of the gradations in the gradation area divided image displayed on the display unit; correcting one of exposure control of an automatic exposure control device and image data acquired by the exposure control so as to obtain a correct exposure for the one of the gradations selected in the selecting step; and recording the image data acquired by the correcting.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing the structure of an image capturing apparatus according to an embodiment of this invention;

FIG. 2 is a flow chart showing an example of an operational sequence of the image capturing apparatus;

FIG. 3 is a view of assistance in explaining an example of a display on an LCD.

DETAILED DESCRIPTION OF THE PREFERRED EMBODIMENT

Figure 4:
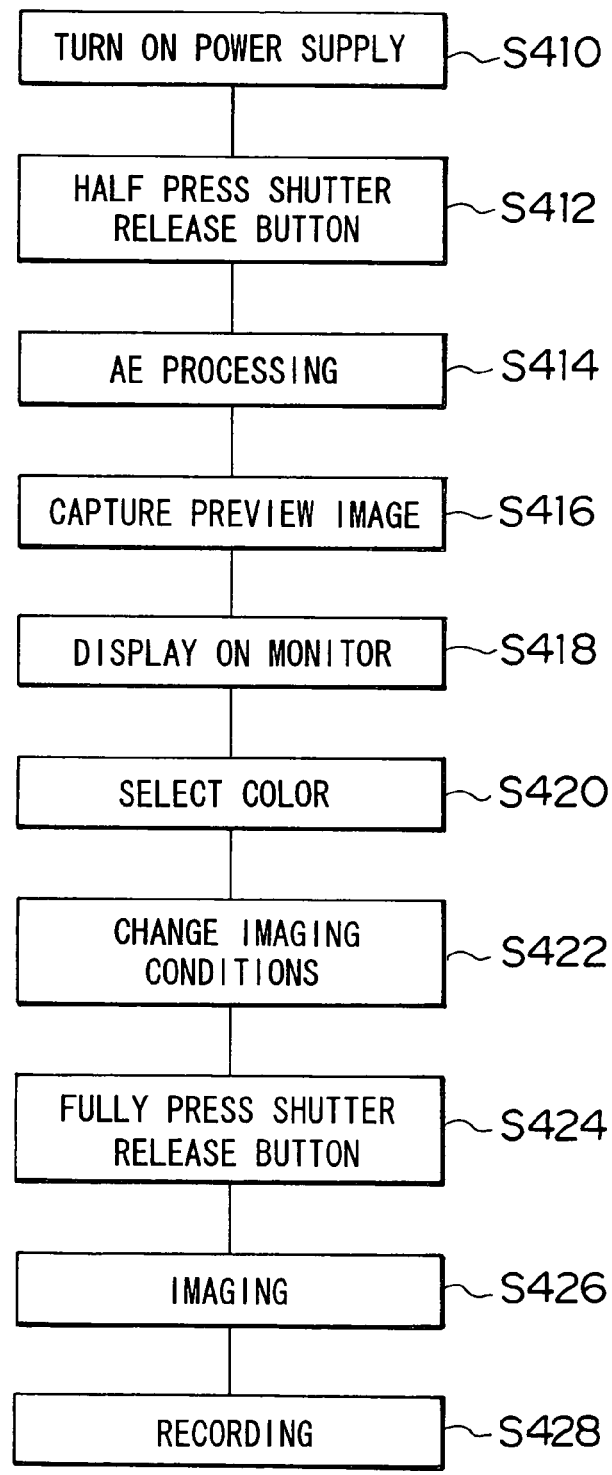
FIG. 4 is a flow chart showing another example of an operational sequence of the image capturing apparatus.

This invention will be described in further detail by way of example with reference to the accompanying drawings.

FIG. 1 is a block diagram showing the structure of an image capturing apparatus according to an embodiment of the present invention. The image capturing apparatus 10 comprises a taking lens 12, a shutter device 14, an optical low-pass filter 16, an imaging device or a CCD 18, an A/D converter 20, a signal processor 22, a first frame memory 24, a second frame memory 26, a color-coding processor 28, a display processor 30, an LCD 32, a central processing unit (CPU) 34, an exposure controller 36, a recording part 38 and control switches 40.

An image of a subject is formed on a light receiving surface of the CCD 18 through the taking lens 12, and each sensor converts the image into signal electric charges corresponding to the quantity of incident light. The accumulated signal electric charges are read into a shift register in response to read gate pulses generated by a CCD drive circuit of the exposure controller 36. Then, the signal electric charges are sequentially read as voltage signals (analog image signals) corresponding to the signal electric charges in response to register transmission pulses generated by the CCD drive circuit of the exposure controller 36. The CCD 18 has a shutter drain through a shutter gate, which is controlled in response to shutter gate pulses generated by the CCD drive circuit to discharge the signal electric charges accumulated by the sensors into the shutter drain. More specifically, the CCD 18 has a so-called electronic shutter function for controlling the electric charge accumulation time (shutter speed) in response to the shutter gate pulses.

The signals read from the CCD 18 are performed with predetermined processing such as color-separating and gain-adjusting, and then the A/D converter 20 converts the processed signals into digital signals, which are supplied to the signal processor 22. The signal processor 22 includes an image signal processor such as a signal generating circuit (Y/C processor) that generates luminance signals and color differential signals, and a gamma correcting circuit. The digital signals are converted into electronic image data in accordance with a known image signal processing technique, and the image data is stored in the first frame memory 24.

The CPU 34 has a memory controller function, and also serves as a later-described AE correcting part. The image data stored in the first frame memory 24 is transmitted to the color-coding circuit 28 under the control of the CPU 34. The color-coding circuit 28 divides the image data into a plurality of gradation areas (e.g., of 3–20 gradation levels, more preferably of 5–10 gradation levels) according to predetermined luminance thresholds. The color-coding circuit 28 applies different colors to the gradation areas of different gradation levels in the image data. The image data is thus color-coded with a coarser gradation than that in the image-capturing and is stored in the second frame memory 26.

The image data stored in the first frame memory 24 and the image data stored in the second frame memory 26 are selectively transmitted to the display processor 30 through a switch 42. A contact of the switch 42 is switched in accordance with a control signal transmitted from the CPU 34. The CPU 34 may automatically switch the contact of the switch 42 in accordance with a control program, or may switch the contact in accordance with operations of a predetermined one of the control switches 40.

The display processor 30 converts the image data received from the first frame memory 24 or the second frame memory 26 into a video signal in a predetermined form, which is outputted to the LCD 32. Thus, the captured image or the color-coded image processed according to the luminance thresholds is displayed on the LCD 32. Of course, it is possible to provide another display memory so that both images can be displayed on one screen at the same time. A display area for one of the images may be larger than that for the other.

The LCD 32 displays not only the above-mentioned images but also a menu, selection keys (buttons), and the like for inputting information. The user can input various pieces of information by setting a pointer (cursor) at a key representing a desired item and then pressing an execution key. In this case, control switches such as an up/down key and a cross key for designating upward, downward, right and left directions are provided at the body of the image capturing apparatus 10 or a control unit of a remote control or the like.

As described later in detail, the subject is imaged with the normal AE function at first, and the image data is temporarily stored in the first frame memory 24. The color-coded image representing the luminance distribution of the captured image is displayed on the LCD 32 before the image data is written in the recording part 38. If the user selects a color of an area corresponding to the main subject on the color-coded image, the CPU 34 adjusts and determines a gradation converting property, which sets a relation between a relative reflection factor (an input voltage) and a QL value (a digital output level), to adjust the image data over the whole gradation so that the area of the selected color can be reproduced with a correct exposure. Therefore, the main subject desired by the user can always be reproduced with a correct exposure.

The CPU 34 controls the circuits according to signals inputted from the control switches 40, and the like. The CPU 34 controls the drive of the CCD 18 and the reading/writing at the recording part 38, and calculates the exposure value, the focusing position and the like according to a predetermined algorithm to control the automatic exposure (AE), an autofocus (AF), an automatic driving of an electronic flash, an auto white balance, and the like.

More specifically, the CPU 34 finds the brightness of the subject (the subject luminance) and a luminance distribution in accordance with the diaphragm value and the electronic shutter speed at present and an integrated mean value of the image signals outputted from the signal processor 22. In accordance with the found brightness of the subject, the CPU 34 sets a diaphragm value and the electric charge accumulation time (an electronic shutter speed), and controls a diaphragm mechanism in accordance with the set diaphragm value. The CPU 34 also controls the CCD drive circuit in accordance with the set electronic shutter speed.

Thus, the CPU 34 determines the brightness of the subject by processing the output signals from the CCD 18 at the signal processor 22, and controls the exposure controller 36 in accordance with the determination results. The CCD 18 is used to determine the brightness of the subject in the AE function, but it is possible to provide a special photometry device for determining the brightness of the subject.

To perform the autofocus, for example, a focus evaluation value representing the sharpness of the subject's image is calculated from the image signals, and the focus position is calculated according to the focus evaluation value. The taking lens 12 is controlled through a focus drive circuit (not illustrated) according to the calculated focus position, and the focus position is set. Alternatively, a known focusing means such as an AF sensor may be used for the autofocus.

For example, when a shutter release button included in the control switches 40 is pressed, the CPU 34 senses this and transmits a command to the exposure controller 36. The exposure controller 36 controls the focus by a lens driving part (not illustrated), and controls the exposure by controlling the shutter device 14, which is also used as the diaphragm, and the electric charge accumulation time at the CCD 18.

The AE correction is performed for the image before the storage of the image captured with use of the AE function as described later, or the AE correction is directly performed for the AE function in the image capturing. The finally-acquired image data is recorded in the recording part 38 through the CPU 34. The recording part 38 may be either a built-in memory or a detachable external storage medium such as a memory card. If the built-in memory is used as the recording part 38, an external output terminal and a communication interface are provided for outputting the stored data.

A description will now be given of the method for correcting the AE in the image capturing apparatus 10 that is constructed in the above-mentioned manner.

FIG. 2 is a flow chart showing an example of the operational sequence of the image capturing apparatus 10. FIG. 2 shows the procedure for correcting an error in the AE after the image capturing.

After the power supply of the image capturing apparatus 10 is turned on (S210), when the shutter release button is half pressed (S212), the AE function is activated according to the normal control program and an appropriate exposure time t is determined by the AE calculation (S214). Then, if the shutter release button is fully pressed (S216), an image is captured (S218). More specifically, the image is captured with the exposure time t, and the captured image is stored in the first frame memory 24. At the same time, the color-coding circuit 28 color-codes the captured image according to the luminance thresholds, and then the color-coded image is displayed on the LCD 32 (S220).

FIG. 3 is an example of the display on the LCD 32. A contour 48 of the subject is displayed on a screen 46, and one or more areas 50 within a specific luminance range are displayed in one color. A color panel 54 is displayed at the right end of the screen 46. The color panel 54 is composed of color samples 52, which represent the gradation levels and are vertically arranged in a line. FIG. 3 shows the color panel 54 in six color-codes, but the LCD 32 may take a variety of display forms. The user may select the display form. Examples of parameters for specifying the display form are the number of color-codes displayed on a gradation area divided image, which is color-coded according to the luminance thresholds, the number of color-codes displayed on the color panel 54, a position of the color panel 54 and a form of each color-code sample 52, and a method for selecting one color from the color panel 54.

The number of color-codes displayed on the gradation area divided image, which is the image color-coded according to the luminance thresholds, can be selected freely from the following: all colors, several colors, a combination of one color and the contour, and a combination of blinking one-color and the contour. If only one color is displayed in the image, it is difficult to recognize the image as a picture. For this reason, the contour 48 of the subject is preferably abstracted from the captured image and displayed on the gradation area divided image. The subject area displayed in one color can be recognized more easily by blinking the area.

The number of colors on the color panel 54 can be selected from the following: all colors, several colors, one color and no display. The "no display (i.e., the color panel 54 is not displayed)" may be selected since the color panel 54 may be unnecessary if only one color is displayed in the color-coded image. The color panel 54 may be displayed on the right side of the screen in a line, displayed on the right side of the screen to be scrolled or displayed separately at the four corners of the screen, or the color panel 54 may not be displayed on the screen.

A color can be selected from the color panel 54 by moving a cursor 56 with the cross key and pressing an execution button, or by touching a touch panel provided on the LCD 32. If the cursor 56 is moved in FIG. 3, one or more areas within the luminance range defined by the selected color are displayed in the selected color in the image.

The user selects a color for a part corresponding to the main subject with reference to the color-coded image, or the user may select a color for a position desired to be finished with a correct exposure (S222 in FIG. 2). For example, the color of the brightest part in the main subject is selected.

If the user selects a color at the part corresponding to the main subject, the dynamic range, the gamma characteristics, and the like of the image are determined so that the areas in the selected color can have a correct luminance, and the correction is performed in accordance with the determination (S224). For example, the brightness of the main subject is corrected to values desirable for the main subject (e.g., the QL values are about 200 if there are 256 levels). If the CCD 18 has the broad dynamic range, the range of the output may be adjusted.

The corrected image data is stored in the recording part 38 (S226). It is therefore possible to always obtain the image in which the main subject desired by the user has been captured with the correct exposure. If the above-described method is applied to the normal AE, the AE can be more accurate.

FIG. 4 is a flow chart showing another example of the operational sequence of the image capturing apparatus 10, which feeds back the information about the main subject to the AE before the image capturing for the record.

After the power supply of the image capturing apparatus 10 is turned on (S410), when the shutter release button is half pressed (S412), the AE is performed according to the normal control program and the appropriate exposure time t is determined according to the AE calculation (S414). Then, a preview image is captured (S416). At this time, the preview image is color-coded according to the luminance thresholds by the color-coding circuit 28, and the color-coded image is displayed on the LCD 32 (S418).

The display on the monitor is similar to the one described with reference to FIG. 2. The user selects a color of the part corresponding to the main subject with reference to the color-coded image, or the user may select a color at the position desired to be finished with a suitable exposure (S420).

Accordingly, the imaging condition (the AE value) is adjusted so that the area in the selected color can have a correct exposure (S422). If the shutter release button is fully pressed (S424), the image is captured according to the changed AE value (S426) and the captured image data is recorded in the recording part 38 (S428).

In the processing method described in the flow chart of FIG. 4, the frame memory 24 can also be used as the frame memory 26, and the frame memory 26 may be omitted.

In FIG. 1, the vacant capacity of the recording medium in the recording part 38 may also be used as the frame memories 24 and 26. In this case, the CPU 34 monitors and utilizes the vacant capacity of the recording medium.

In the above description, the present invention is applied to the image capturing apparatus for recording still images, but the present invention may also be applied to an image capturing apparatus for recording motion images.

According to the image capturing apparatus and the automatic exposure control correcting method of the present invention, the color-coded image representing the luminance distribution of the captured image is displayed, the user designates the area corresponding to the main subject before the storage of the data about the captured image, and the exposure is adjusted so that the designated area can be captured with the correct exposure. Therefore, the main subject desired by the user can always be imaged with the correct exposure.

A desired area can be selected correctly by displaying the color-coded image, and the exposure can be corrected regardless of the brightness of the image display device.

In addition, the accuracy of the AE can be improved by feeding back the corrected results to the AE control.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image capturing apparatus, comprising:
    an imaging system including a lens and an imaging device, the lens forming an image of a subject on a light receiving surface of the imaging device, the imaging device converting the image of the subject to an electronic image signals;
    a display unit that displays an image in accordance with signals captured through the imaging device;
    a photometry device that determines a luminance of the subject;
    an automatic exposure control device that automatically adjusts exposure of the imaging system in accordance with the luminance of the subject determined by the photometry device;
    a gradation area dividing device that processes the electronic image signals read from the imaging device so as to divide, according to predetermined luminance thresholds, an image obtained by an image-capturing through the imaging system into areas of gradations coarser than gradations in the image capturing;
    a color-coding device that generates an image signal representing a gradation area divided image by applying the same color to at least one area in the same luminance range in the image obtained by the image-capturing so that the areas of gradations divided by the gradation area dividing device are visually distinguished, the display unit receiving the image signal generated by the color coding device and displaying the gradation area divided image;
    a luminance range designating device that designates one of the gradations corresponding to the subject in the gradation area divided image displayed on the display unit;
    a correcting device that corrects at least one of exposure control of the automatic exposure device and image data obtained with the exposure control so as to obtain a correct exposure for the one of the gradations designated by the luminance range designating device;
    a recording device that records the image data corrected by the correcting device; and
    a contour sampling device that samples contour of the subject from the image captured by the imaging device, wherein the image display unit displays the area of gradation color-coded by the color-coding device and the contour of the subject.

2. An image capturing apparatus, comprising:
    an imaging system including a lens and an imaging device, the lens forming an image of a subject on a light receiving surface of the imaging device the imaging device converting the image of the subject to an electronic image signals;
    a display unit that displays an image in accordance with signals captured through the imaging device;
    a photometry device that determines a luminance of the subject;
    an automatic exposure control device that automatically adjusts exposure of the imaging system in accordance with the luminance of the subject determined by the photometry device;
    a gradation area dividing device that processes the electronic image signals read from the imaging device so as to divide, according to predetermined luminance thresholds, an image obtained by an image-capturing through the imaging system into areas of gradations coarser than gradations in the image capturing;
    a color-coding device that generates an image signal representing a gradation area divided image by applying the same color to at least one area in the same luminance range in the image obtained by the image-capturing so that the areas of gradations divided by the gradation area dividing device are visually distinguished the display unit receiving the image signal generated by the color coding device and displaying the gradation area divided image;
    a luminance range designating device that designates one of the gradations corresponding to the subject in the gradation area divided image displayed on the display unit, wherein the luminance range designating device is constructed in such a manner as to select one color from color samples displayed on a screen of the image display unit;

a correcting device that corrects at least one of exposure control of the automatic exposure device and image data obtained with the exposure control so as to obtain a correct exposure for the one of the gradations designated by the luminance range designating device; and a recording device that records the image data corrected by the correcting device.

3. An image capturing apparatus, comprising:

an imaging system including a lens and an imaging device, the lens forming an image of a subject on a light receiving surface of the imaging device, the imaging device converting the image of the subject to an electronic image signals;

a display unit that displays an image in accordance with signals captured through the imaging device;

a photometry device that determines a luminance of the subject;

an automatic exposure control device that automatically adjusts exposure of the imaging system in accordance with the luminance of the subject determined by the photometry device;

a gradation area dividing device that processes the electronic image signals read from the imaging device so as to divide, according to predetermined luminance thresholds, an image obtained by an image-capturing through the imaging system into areas of gradations coarser than gradations in the image capturing;

a color-coding device that generates an image signal representing a gradation area divided image by applying the same color to at least one area in the same luminance range in the image obtained by the image-capturing so that the areas of gradations divided by the gradation area dividing device are visually distinguished, the display unit receiving the image signal generated by the color coding device and displaying the gradation area divided image, wherein the color-coding device gives different colors to the gradation areas divided by the gradation area dividing device;

a luminance range designating device that designates one of the gradations corresponding to the subject in the gradation area divided image displayed on the display unit, wherein the luminance range designating device is constructed in such a manner as to select one color from color samples displayed on a screen of the image display unit;

a correcting device that corrects at least one of exposure control of the automatic exposure device and image data obtained with the exposure control so as to obtain a correct exposure for the one of the gradations designated by the luminance range designating device; and a recording device that records the image data corrected by the correcting device.

4. An image capturing apparatus, comprising:

an imaging system including a lens and an imaging device, the lens forming an image of a subject on a light receiving surface of the imaging device, the imaging device converting the image of the subject to an electronic image signals;

a display unit that displays an image in accordance with signals captured through the imaging device;

a photometry device that determines a luminance of the subject;

an automatic exposure control device that automatically adjusts exposure of the imaging system in accordance with the luminance of the subject determined by the photometry device;

a gradation area dividing device that processes the electronic image signals read from the imaging device so as to divide, according to predetermined luminance thresholds, an image obtained by an image-capturing through the imaging system into areas of gradations coarser than gradations in the image capturing;

a color-coding device that generates an image signal representing a gradation area divided image by applying the same color to at least one area in the same luminance range in the image obtained by the image-capturing so that the areas of gradations divided by the gradation area dividing device are visually distinguished, the display unit receiving the image signal generated by the color coding device and displaying the gradation area divided image;

a luminance range designating device that designates one of the gradations in the gradation area divided image displayed on the display unit;

a correcting device that corrects the image data for the gradations area designated by the luminance range designating device, wherein the correcting device only corrects the image data of the area designated by the luminance range designating device; and a recording device that data corrected by the correcting device.

* * * * *